(12) United States Patent
Goshima

(10) Patent No.: US 10,365,870 B2
(45) Date of Patent: Jul. 30, 2019

(54) INFORMATION PROCESSING SYSTEM FOR DETECTING OVERLOAD OF A MANAGEMENT SERVER AND PROCESSING A PRIORITY REQUEST HAVING PRIORITY, AND INFORMATION PROCESSING METHOD FOR DETECTING OVERLOAD OF A MANAGEMENT SERVER AND PROCESSING A PRIORITY REQUEST HAVING A HIGH PRIORITY

(71) Applicant: KYOCERA DOCUMENT SOLUTIONS INC., Osaka (JP)

(72) Inventor: Satoshi Goshima, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/044,049

(22) Filed: Jul. 24, 2018

(65) Prior Publication Data

US 2019/0034141 A1 Jan. 31, 2019

(30) Foreign Application Priority Data

Jul. 27, 2017 (JP) ................................ 2017-145648

(51) Int. Cl.
 *G06F 3/12* (2006.01)
 *H04N 1/00* (2006.01)
(52) U.S. Cl.
 CPC ............ *G06F 3/1261* (2013.01); *G06F 3/122* (2013.01); *G06F 3/1224* (2013.01);
 (Continued)

(58) Field of Classification Search
 None
 See application file for complete search history.

(56) References Cited

U.S. PATENT DOCUMENTS

2003/0227651 A1* 12/2003 Mathieson ............ G06F 13/385
 358/1.16
2005/0117918 A1* 6/2005 Kimura ................ G03G 15/553
 399/8

(Continued)

FOREIGN PATENT DOCUMENTS

JP 2005-327097 A 11/2005

*Primary Examiner* — Thomas D Lee
(74) *Attorney, Agent, or Firm* — Li & Cai Intellectual Property (USA) Office

(57) ABSTRACT

The management server includes an overload detecting unit that detects whether or not the management server is overloaded, a priority deciding unit that, if the management server is overloaded, searches the image forming apparatus database for the serial number in the processing request received by the request receiving unit, obtains the information of the image forming apparatus that sends the processing request, and decides a priority of processing the processing request on a basis of the obtained information, a request processing unit that processes the processing request, the priority deciding unit having decided that the processing request has a high priority, and a delay-request requiring unit that sends a delay-request requirement to the image forming apparatus that sent the processing request, the priority deciding unit having decided that the processing request has a low priority, the delay-request requirement requiring to resend the processing request after a specified time.

5 Claims, 6 Drawing Sheets

(52) U.S. Cl.
CPC ....... *G06F 3/1263* (2013.01); *H04N 1/00244* (2013.01); *G06F 3/1288* (2013.01)

(56) References Cited

U.S. PATENT DOCUMENTS

| | | | |
|---|---|---|---|
| 2010/0218191 A1* | 8/2010 | Kannan | G06F 9/5027 |
| | | | 718/103 |
| 2011/0125655 A1* | 5/2011 | Chiyo | G06F 21/10 |
| | | | 705/310 |
| 2012/0076022 A1* | 3/2012 | Shibata | H04L 43/0817 |
| | | | 370/252 |
| 2012/0086978 A1* | 4/2012 | Uchikawa | G06F 3/1212 |
| | | | 358/1.15 |
| 2015/0333976 A1* | 11/2015 | Puttanna | H04W 12/08 |
| | | | 709/223 |
| 2016/0277241 A1* | 9/2016 | Nakamori | H04L 41/0813 |
| 2017/0118248 A1* | 4/2017 | Ohno | H04L 63/083 |

* cited by examiner

INFORMATION PROCESSING SYSTEM FOR DETECTING OVERLOAD OF A MANAGEMENT SERVER AND PROCESSING A PRIORITY REQUEST HAVING PRIORITY, AND INFORMATION PROCESSING METHOD FOR DETECTING OVERLOAD OF A MANAGEMENT SERVER AND PROCESSING A PRIORITY REQUEST HAVING A HIGH PRIORITY

CROSS REFERENCE TO RELATED APPLICATION

This application claims the benefit of Japanese Priority Patent Application JP 2017-145648 filed Jul. 27, 2017, the entire contents of which are incorporated herein by reference.

BACKGROUND OF THE INVENTION

1. Field of the Invention

The present disclosure relates to an information processing system and an information processing method that remotely manage image forming apparatuses (MFPs, Multifunction Peripherals).

2. Description of Related Art

In recent years, in order to remotely manage many image forming apparatuses provided in customer sites, the image forming apparatuses send various status information to a central management server via a network.

SUMMARY OF THE INVENTION

It is desirable to provide an information processing system and an information processing method that are capable of reliably preventing a management server from being overloaded.

According to an embodiment of the present disclosure, there is provided an information processing system, including: a management server; and at least one image forming apparatus connected to the management server via a network, the management server including a first communication device adopted to communicate with the at least one image forming apparatus, a memory device that stores an image forming apparatus database, the image forming apparatus database storing information of each of the at least one image forming apparatus in relation with a serial number of each of the at least one image forming apparatus, the serial number being a key, and a first controller, when the first controller executes a first information processing program, the first controller operating as a request receiving unit that receives a processing request from each of the at least one image forming apparatus, an overload detecting unit that detects whether or not the management server is overloaded, a priority deciding unit that, if the management server is overloaded, searches the image forming apparatus database for the serial number in the processing request received by the request receiving unit, obtains the information of the image forming apparatus that sends the processing request, and decides a priority of processing the processing request on a basis of the obtained information, a request processing unit that processes the processing request, the priority deciding unit having decided that the processing request has a high priority, and a delay-request requiring unit that sends a delay-request requirement to the image forming apparatus that sent the processing request, the priority deciding unit having decided that the processing request has a low priority, the delay-request requirement requiring to resend the processing request after a specified time, each of the at least one image forming apparatus including a second communication device adopted to communicate with the management server, and a second controller, when the second controller executes a second information processing program, the second controller operating as an update requesting unit that requests, as the processing request, the management server to update the information of the image forming apparatus, and when receiving the delay-request requirement from the management server, stands by for the specified time, and then resends the processing request.

According to an embodiment of the present disclosure, there is provided an information processing method executed by an information processing system including a management server, and at least one image forming apparatus connected to the management server via a network, the information processing method including: by a memory device of the management server, storing an image forming apparatus database, the image forming apparatus database storing information of each of the at least one image forming apparatus in relation with a serial number of each of the at least one image forming apparatus, the serial number being a key; by an update requesting unit of each of the at least one image forming apparatus, requesting, as a processing request, the management server to update the information of the image forming apparatus; by a request receiving unit of the management server, receiving a processing request from each of the at least one image forming apparatus; by an overload detecting unit of the management server, detecting whether or not the management server is overloaded; by a priority deciding unit of the management server, if the management server is overloaded, searching the image forming apparatus database for the serial number in the processing request received by the request receiving unit, obtaining the information of the image forming apparatus that sends the processing request, and deciding a priority of processing the processing request on a basis of the obtained information; by a request processing unit of the management server, processing the processing request, the priority deciding unit having decided that the processing request has a high priority; by a delay-request requiring unit of the management server, sending a delay-request requirement to the image forming apparatus that sent the processing request, the priority deciding unit having decided that the processing request has a low priority, the delay-request requirement requiring to resend the processing request after a specified time; and by an update requesting unit of the image forming apparatus, receiving the delay-request requirement from the management server, standing by for the specified time, and then resending the processing request.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 3 shows an example of a configuration of the image forming apparatus DB 17a;

DETAILED DESCRIPTION OF THE PREFERRED EMBODIMENTS

Hereinafter, an embodiment of the present disclosure will be described with reference to the drawings.

1. ENTIRE CONFIGURATION AND OVERVIEW

Figure 1:
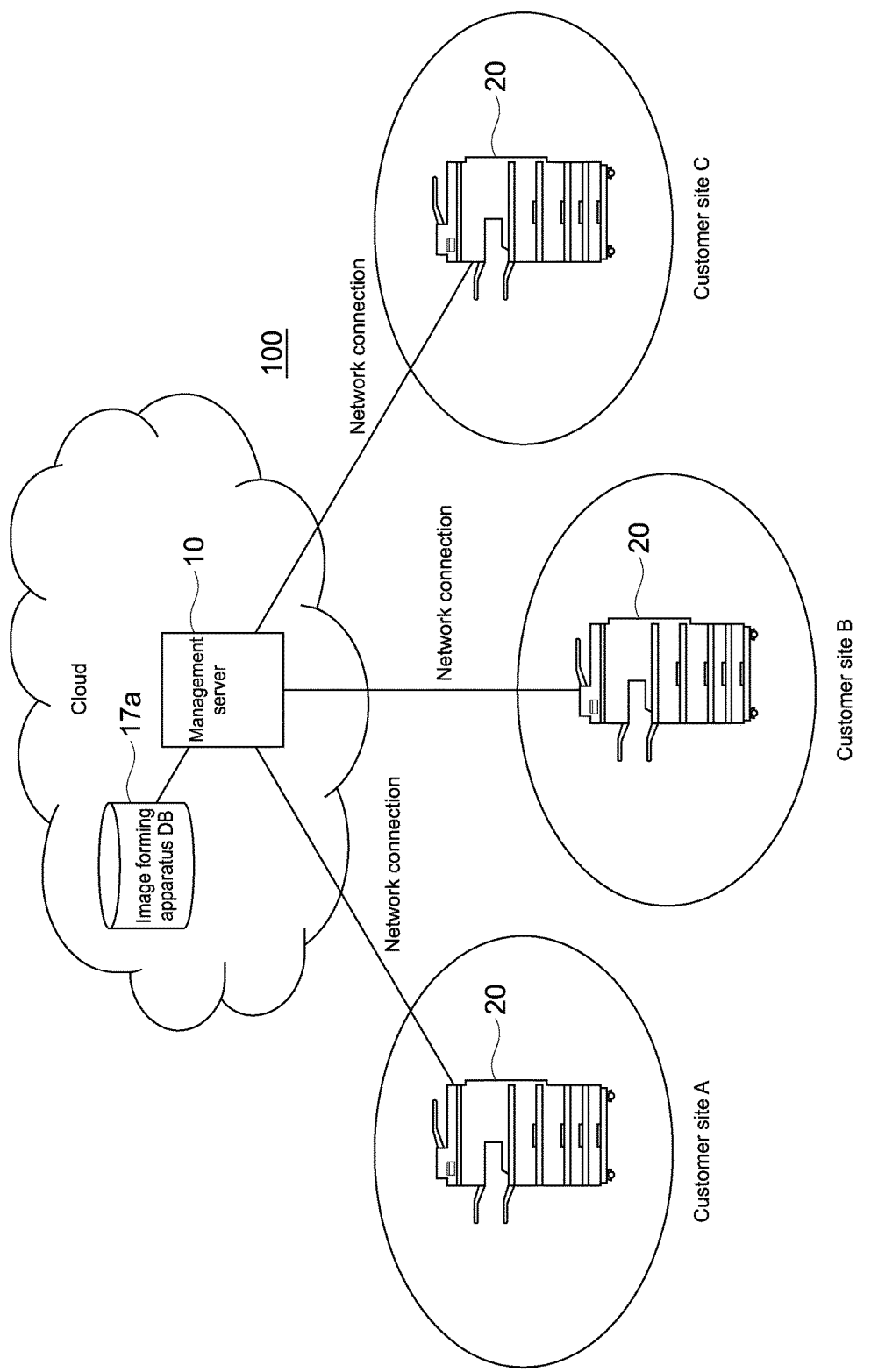
FIG. 1 shows an entire configuration of the information processing system 100 according to an embodiment of the present disclosure.

Firstly, an entire configuration and an overview of the information processing system 100 according to an embodiment of the present disclosure will be described. FIG. 1 shows an entire configuration of the information processing system 100 according to an embodiment of the present disclosure.

The information processing system 100 includes the management server 10 and the one or more image forming apparatuses 20 connected via a network. The management server 10 is in a cloud. Each image forming apparatus 20 is provided at a customer site.

The image forming apparatus 20 provided at each customer site sends status information and the like to the management server 10 at regular intervals, and updates various information in the image forming apparatus DB 17a of the management server 10.

Note that, in FIG. 1, the three image forming apparatuses 20 are connected to the management server 10. However, actually, thousands of image forming apparatuses 20 may be connected to the management server 10.

If a failure occurs in a network and the network recovers from the failure, all the image forming apparatuses 20, which were communicating with the management server 10 before the failure occurred, send reconnecting requests (hereinafter, also referred to as processing requests) all at once.

Therefore, the management server 10 may be overloaded without any countermeasure. The information processing system 100 may not be capable of providing services to users appropriately.

In view of the aforementioned circumstances, when a network recovers from a failure, the information processing system 100 puts priorities on a large number of reconnecting requests sent all at once on the basis of various conditions. The information processing system 100 processes requests having high priorities. In addition, the information processing system 100 requires the image forming apparatuses 20, which sent requests having low priorities, to resend the requests after a specified time.

As a result, it is possible to prevent the management server from being overloaded when a network recovers from a failure.

An entire configuration and an overview of the information processing system 100 according to an embodiment of the present disclosure have been described above.

2. CONFIGURATION OF MANAGEMENT SERVER

Figure 2:
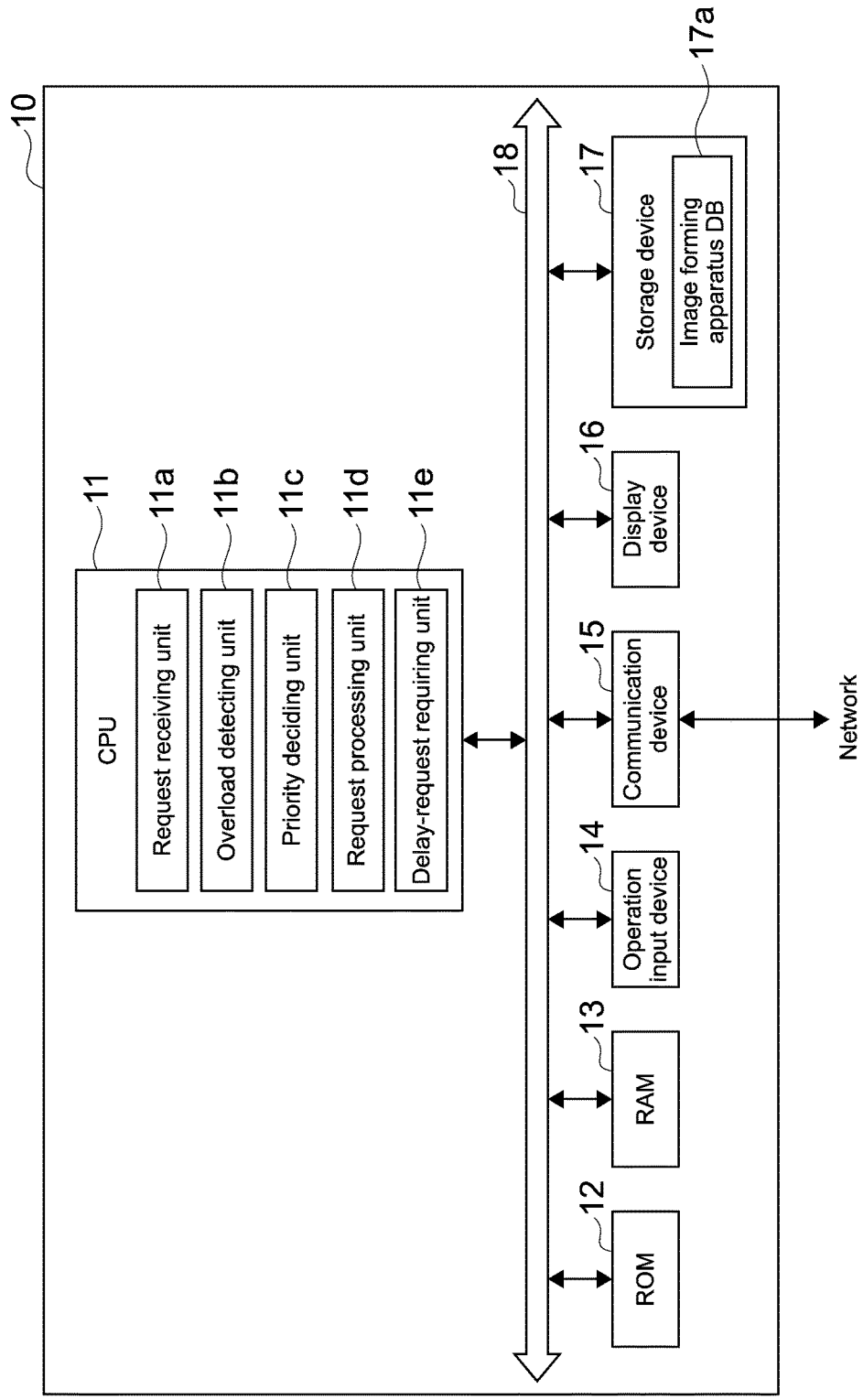
FIG. 2 shows a block configuration of the management server 10.

Next, a configuration of the management server 10 will be described. The management server 10 may include dedicated hardware or software or a general-purpose computer. FIG. 2 shows a block configuration of the management server 10.

As shown in FIG. 2, the management server 10 includes a CPU (Central Processing Unit) 11, a ROM (Read Only Memory) 12, a RAM (Random Access Memory) 13, an operation input device 14, a communication device 15 (first communication device), a display device 16, a storage device 17, and these blocks are connected to each other via a bus 18.

The ROM 12 stores a plurality of programs such as firmware for executing various types of process, and data. The RAM 13 is used as a work area of the CPU 11 and temporarily stores an OS (Operating System), various applications being executed, and various types of data being processed.

The storage device 17 is, for example, an HDD (Hard Disk Drive), a flash memory, or other nonvolatile memories. The storage device 17 stores the OS, various applications, various types of data, and the image forming apparatus DB (database) 17a (described later).

The communication device 15 is connected to a network for sending/receiving information to/from the image forming apparatus 20.

Of the plurality of programs stored in the ROM 12 or the storage device 17, the CPU 11 loads a program in the RAM 13 in response to a command input via the operation input device 14, and appropriately controls the display device 16 and the storage device 17 according to the loaded program.

The operation input device 14 is, for example, a pointing device such as a mouse, a keyboard, a touch panel, or other operation devices.

The display device 16 is, for example, a liquid crystal display, an EL (Electro-Luminescence) display, or a plasma display.

Next, functional blocks will be described. When the CPU 11 (first controller) of the management server 10 executes a program (first information processing program), the CPU 11 operates as the functional blocks described below.

The functional blocks that the CPU 11 of the management server 10 realizes are the request receiving unit 11a, the overload detecting unit 11b, the priority deciding unit 11c, the request processing unit 11d, and the delay-request requiring unit 11e.

The request receiving unit 11a receives a processing request from the image forming apparatus 20.

The overload detecting unit 11b detects whether or not the management server 10 is overloaded.

The priority deciding unit 11c, if the management server 10 is overloaded, searches the image forming apparatus DB 17a for the serial number of the image forming apparatus 20 in the processing request received from the image forming apparatus 20 by the request receiving unit 11a, obtains the location, the past operation status, and the counter information deadline of the image forming apparatus 20 that sends the processing request, and decides a priority of processing the processing request on a basis of the obtained location, the obtained past operation status, and the obtained counter information deadline.

The request processing unit 11d processes the processing request, the priority deciding unit 11c having decided that the processing request has a high priority. Mainly, the request processing unit 11d updates the status information and the like in the image forming apparatus DB 17a.

The delay-request requiring unit 11e sends a delay-request requirement to the image forming apparatus 20 that sent the processing request, the priority deciding unit 11c having decided that the processing request has a low priority, the delay-request requirement requiring to resend the processing request after a specified time.

The configuration of the management server 10 has been described above.

3. IMAGE FORMING APPARATUS DB

Figure 3:
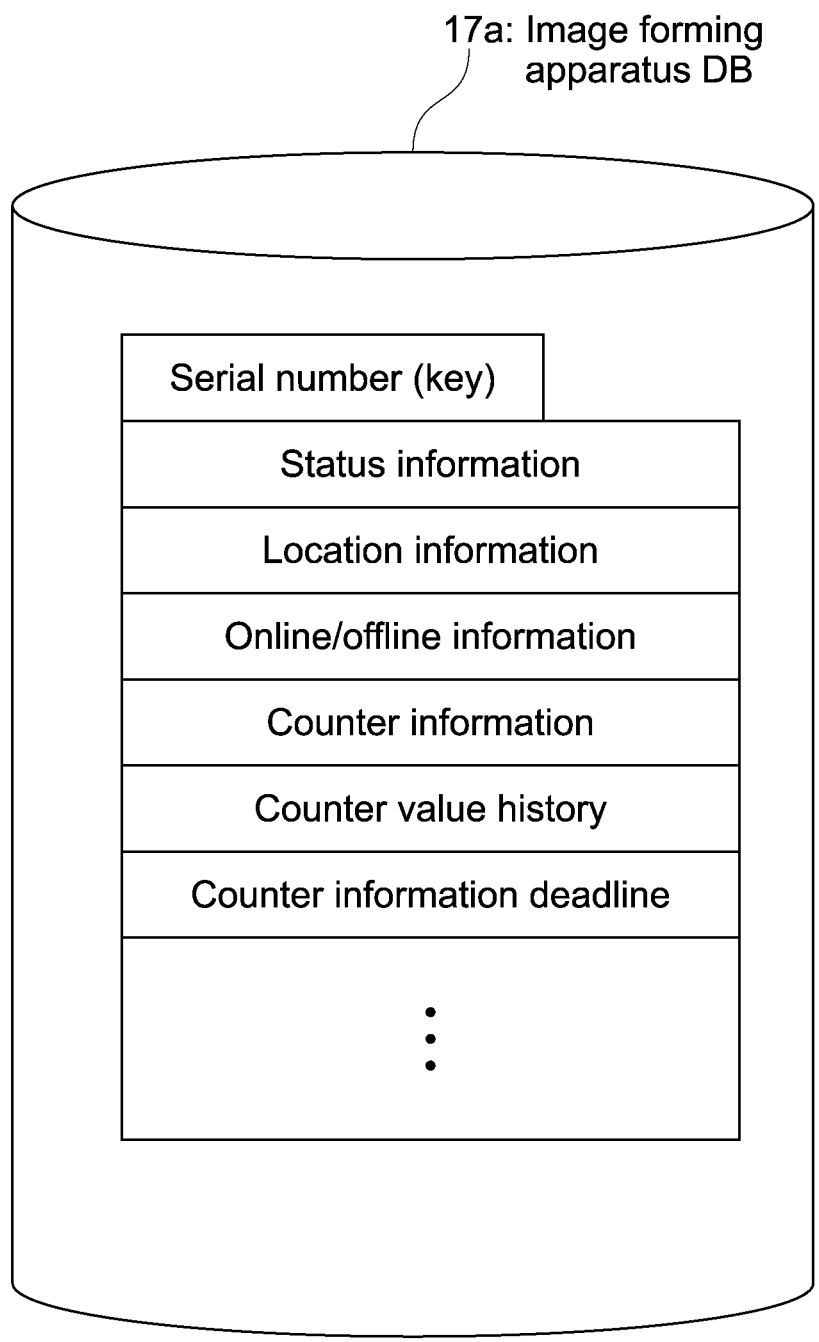

Next, the image forming apparatus DB 17a will be described. FIG. 3 shows an example of a configuration of the image forming apparatus DB 17a.

The image forming apparatus DB 17a stores information (the status information, the location information, the online/offline information, the counter information, the counter value history, the counter information deadline, and the like) of the image forming apparatus 20 in relation with a serial number of the image forming apparatus 20, the serial number being a key.

The status information indicates an error status of the image forming apparatus 20, and the like.

The location information indicates a site (region) in which the image forming apparatus 20 is provided. The work time at the site, in which the image forming apparatus 20 is provided, may be determined on the basis of the location information.

The online/offline information indicates whether the image forming apparatus 20 is in the online status or the offline status.

The counter information indicates the counter value of the image forming apparatus 20.

The counter value history is a history of recorded past counter values. The past operation status of the image forming apparatus 20 can be understood on the basis of the history.

The counter information deadline is the deadline of the counter information. A dealer charges to a customer depending on usage of the image forming apparatus 20. The deadline may be the 10th or 20th of every month.

The aforementioned information is updated in response to an update request from each image forming apparatus 20.

The image forming apparatus DB 17a has been described above.

4. CONFIGURATION OF IMAGE FORMING APPARATUS

Figure 4:
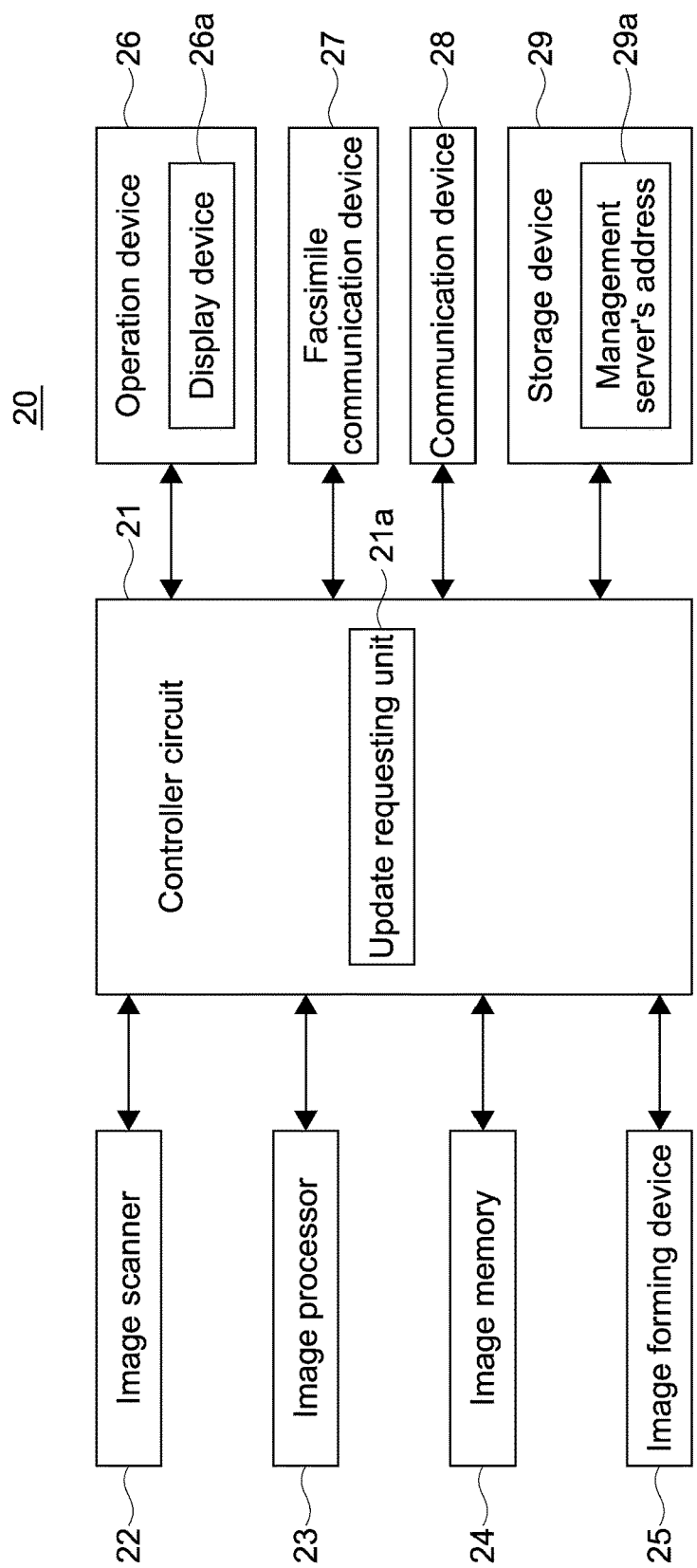
FIG. 4 schematically shows a configuration of the image forming apparatus 20.

Next, a configuration of the image forming apparatus 20 according to an embodiment of the present disclosure will be described. FIG. 4 schematically shows a configuration of the image forming apparatus 20.

The image forming apparatus 20 includes a controller circuit 21. The controller circuit 21 includes a CPU, a RAM, a ROM, dedicated hardware circuits, and the like and performs overall operational control of the image forming apparatus 20.

The controller circuit 21 is connected to an image scanner 22, an image processor 23, an image memory 24, an image forming device 25, an operation device 26, a display device 26a, a facsimile communication device 27, a communication device 28 (second communication device), a storage device 29, and the like. The controller circuit 21 performs operational control of the respective devices connected thereto and sends/receives signals and data to/from those devices.

According to job execution instructions input by a user via the operation device 26 or a personal computer (PC) connected to the network, the controller circuit 21 controls drive and process of mechanisms requisite for executing operational control of functions such as a scanner function, a printing function, a copy function, and a facsimile sending/receiving function.

Further, the controller circuit 21 includes the update requesting unit 21a. The CPU (second controller) of the image forming apparatus 20 loads a program (second information processing program), which is stored in a ROM or the like, in a RAM and executes the program. When the CPU of the image forming apparatus 20 executes the program, the CPU operates as the update requesting unit 21a, which is a functional block.

The update requesting unit 21a requests the management server 10 to update the status information, the counter information, and the like of the image forming apparatus 20. If a failure occurs in the network during communication with the management server 10, the update requesting unit 21a resends the processing request after the network recovers from the failure.

Further, if the update requesting unit 21a receives a delay-request requirement from the management server 10, the delay-request requirement requiring to resend the processing request after a specified time, the update requesting unit 21a stands by for the specified time, and then resends the processing request.

The image scanner 22 reads an image from a script.

The image processor 23 carries out an image process as necessary on image data of an image read by the image scanner 22. For example, the image processor 23 corrects shading of an image read by the image scanner 22 and carries out other image process to improve the quality of the image to be formed.

The image memory 24 includes an area that temporarily stores data of a script image read by the image scanner 22 or data to be printed by the image forming device 25.

The image forming device 25 forms an image of image data and the like read by the image scanner 22.

The operation device 26 includes a touch panel device and an operation key device that accept user's instructions on various operations and processes executable by the image forming apparatus 20. The touch panel device includes the display device 26a such as an LCD (Liquid Crystal Display) equipped with a touch panel.

The facsimile communication device 27 includes an encoding/decoding device, a modulation/demodulation device, and an NCU (Network Control Unit) (all of which are not shown) and transmits facsimiles using a public telephone network.

The communication device 28 is constituted of a communication module such as a LAN board and sends/receives various types of data to/from apparatuses such as the management server 10 connected to the network via a LAN connected to the communication device 28, and the like.

The storage device 29 stores a script image read by the image scanner 22, the management server's address 29a, and the like. The storage device 29 is a large-volume storage device such as an HDD.

The image forming apparatus 20 refers to the management server's address 29a when the image forming apparatus 20 communicates with the management server 10.

A configuration of the image forming apparatus 20 has been described above.

5. MAIN PROCESSING FLOW

Figure 5:
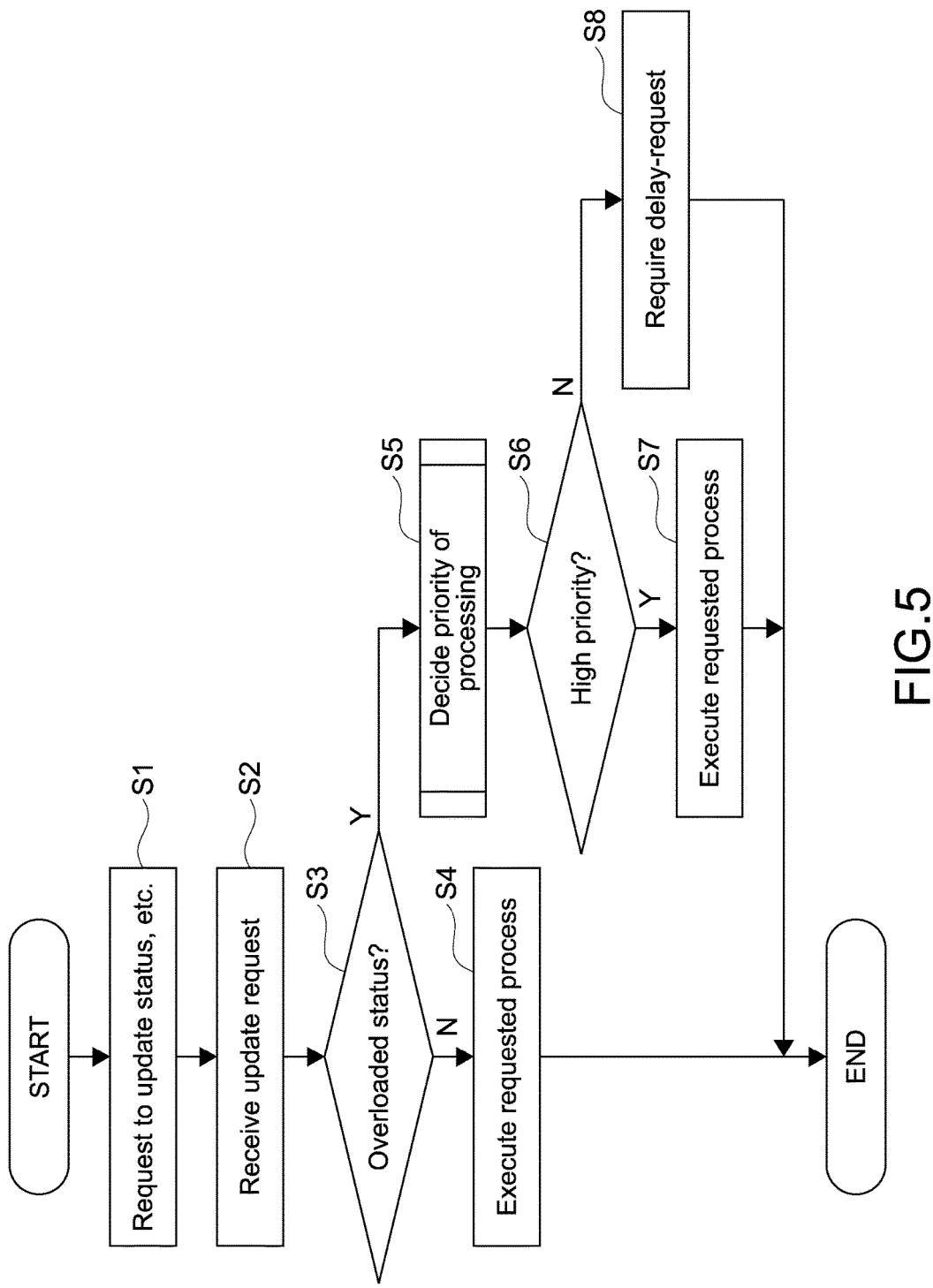
FIG. 5 shows a main processing flow of the information processing system 100.

Next, a main processing flow of the information processing system 100 will be described. FIG. 5 shows a main processing flow of the information processing system 100.

Firstly, the update requesting unit 21a of the image forming apparatus 20 sends a request (processing request) to update the status and the like to the management server 10 (here, the update requesting unit 21a also sends a reconnecting request after the network recovers from a failure) (Step S1).

Next, the request receiving unit 11a of the management server 10 receives the processing request from the image forming apparatus 20 (Step S2).

Next, the overload detecting unit 11b of the management server 10 detects whether or not the management server 10 is in an overloaded status now (Step S3).

If the management server 10 is not in an overloaded status (Step S3, N), the request processing unit 11d of the management server 10 executes the process requested by the image forming apparatus 20, and completes the processing flow (Step S4).

If the management server 10 is in an overloaded status (Step S3, Y), the priority deciding unit 11c of the management server 10 decides the priority of the processing request (Step S5). How to decide the priority will be described later.

Next, the priority deciding unit 11c of the management server 10 determines whether or not the decided priority of the processing request is high (Step S6).

If the priority of the processing request is high (Step S6, Y), the request processing unit 11d of the management server 10 executes the process requested by the image forming apparatus 20, and completes the processing flow (Step S7).

If the priority of the processing request is low (Step S6, N), the delay-request requiring unit 11e of the management server 10 requires the image forming apparatus 20, which sent the request, to resend the processing request after a specified time, and completes the processing flow (Step S8).

A main processing flow of the information processing system 100 has been described above.

6. PROCESSING FLOW OF DECIDING PRIORITY

Figure 6:
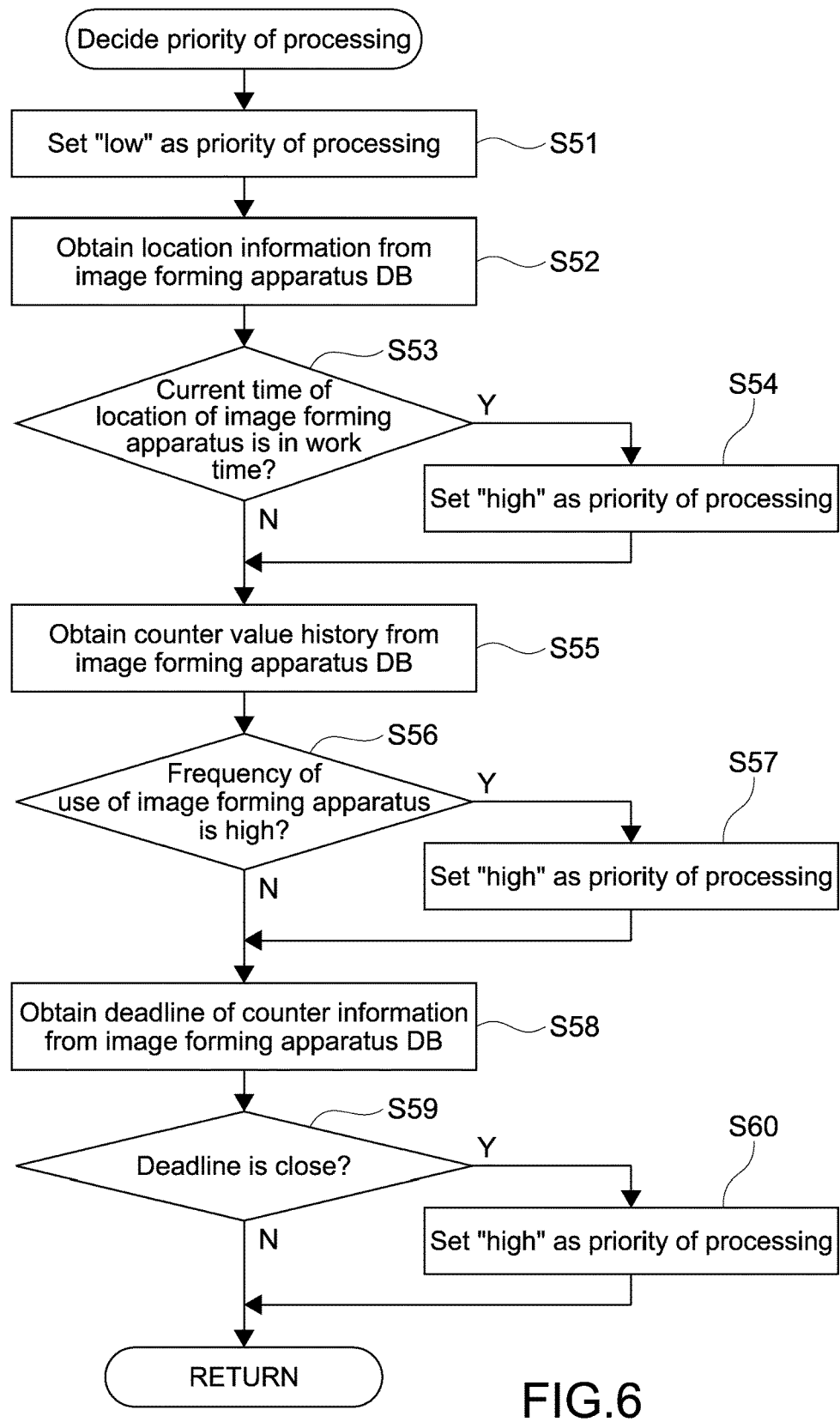
FIG. 6 shows a processing flow of deciding the priority of the processing request executed by the priority deciding unit 11c of the management server 10.

Next, a processing flow of deciding the priority of the processing request executed by the priority deciding unit 11c of the management server 10 will be described. FIG. 6 shows a processing flow of deciding the priority of the processing request executed by the priority deciding unit 11c of the management server 10.

Firstly, the priority deciding unit 11c sets "low" as the priority of the processing request (Step S51).

Next, the priority deciding unit 11c obtains location information from the image forming apparatus DB 17a (Step S52).

Next, the priority deciding unit 11c determines whether or not the current time of a site, in which the image forming apparatus 20 is provided, is in a work time (for example, in Japan, 9 AM to 5 PM) based on the obtained location information of the image forming apparatus 20 that sent the processing request (Step S53). The reason is as follows. It is assumed that there is no problem even if the image forming apparatus 20, which is not in the work time, has the low priority and even if the image forming apparatus 20 is required to resend the request after a specified time.

If the current time is in the work time (Step S53, Y), the priority deciding unit 11c changes the priority of the processing request by setting "high" as the priority (Step S54).

If the current time is not in the work time (Step S53, N), the priority deciding unit 11c just proceeds to the next process (Step S55).

Next, the priority deciding unit 11c obtains a counter value history from the image forming apparatus DB 17a (Step S55).

Next, the priority deciding unit 11c calculates the frequency of use of the image forming apparatus 20 that sent the processing request on the basis of the obtained counter value history. The priority deciding unit 11c determines whether or not the frequency of use is high (whether or not frequency of use is equal to or larger than first threshold) (Step S56). The reason is as follows. It is assumed that there is no problem even if the image forming apparatus 20, whose frequency of use is low, has the low priority and even if the image forming apparatus 20 is required to resend the request after a specified time.

If the frequency of use is equal to or larger than a first threshold (Step S56, Y), the priority deciding unit 11c changes the priority of the processing request by setting "high" as the priority (Step S57).

If the frequency of use is smaller than the first threshold (Step S56, N), the priority deciding unit 11c just proceeds to the next process (Step S58).

Next, the priority deciding unit 11c obtains the deadline of the counter information from the image forming apparatus DB 17a (Step S58).

Next, the priority deciding unit 11c determines whether or not the deadline is close on the basis of the obtained deadline of the counter information (whether or not the number of days from current time to deadline is equal to or smaller than second threshold) (Step S59). The counter information is the most important information for charging to customers. It is necessary for the image forming apparatus 20, whose deadline is close, to collect the counter information with the highest priority.

If the number of days to the deadline is equal to or smaller than the second threshold (Step S59, Y), the priority deciding unit 11c changes the priority of the processing request by setting "high" as the priority, and returns to the main routine (Step S60).

If the number of days to the deadline is larger than the second threshold (Step S59, N), the priority deciding unit 11c just returns to the main routine.

A processing flow of deciding the priority of the processing request executed by the priority deciding unit 11c of the management server 10 has been described above.

7. CONCLUSION

In recent years, in order to remotely manage many image forming apparatuses provided in customer sites, the image forming apparatuses send various status information to a central management server via a network.

The larger the number of the managed image forming apparatuses, the larger the load applied to the network through which the status information is sent.

In view of the aforementioned circumstances, according to a conceivable method, in order to reduce the load applied to the network, for example, the kinds of status information collected by the management server are narrowed down, necessary kinds of status information are thereby obtained, the amount of sent data is reduced, and the load applied to the network is reduced.

However, according to this method, after a failure occurs in the network, the image forming apparatuses send requests to update the status all at once at the time when the network recovers from the failure. According to this method, it is not possible to prevent the management server from being overloaded.

To the contrary, according to the present embodiment, when a network recovers from a failure, the information processing system 100 puts priorities on a large number of reconnecting requests sent all at once on the basis of various conditions. The information processing system 100 processes requests having high priorities. In addition, the information processing system 100 requires the image forming apparatuses 20, which sent requests having low priorities, to resend the requests after a specified time.

As a result, it is possible to prevent the management server from being overloaded when the network recovers from the failure.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
   a management server; and
   at least one image forming apparatus connected to the management server via a network, the management server including
      a first communication device connected to the network for sending/receiving information to/from the at least one image forming apparatus,
      a memory device that stores an image forming apparatus database, the image forming apparatus database storing information of each of the at least one image forming apparatus in relation with a serial number of each of the at least one image forming apparatus, the serial number being a key, and
      a first controller,
   when the first controller executes a first information processing program, the first controller operating as
      a request receiving unit that receives a processing request from each of the at least one image forming apparatus,
      an overload detecting unit that detects whether or not the management server is overloaded,
      a priority deciding unit that, if the management server is overloaded,
         searches the image forming apparatus database for the serial number in the processing request received by the request receiving unit,
         obtains the information of the image forming apparatus that sends the processing request, and
         decides a priority of processing the processing request on a basis of the obtained information,
      a request processing unit that processes the processing request, the priority deciding unit having decided that the processing request has a high priority, and
      a delay-request requiring unit that sends a delay-request requirement to the image forming apparatus that sent the processing request, the priority deciding unit having decided that the processing request has a low priority, the delay-request requirement requiring to resend the processing request after a specified time,
   each of the at least one image forming apparatus including
      a second communication device connected to the network for sending/receiving information to/from the management server, and
      a second controller,
   when the second controller executes a second information processing program, the second controller operating as
      an update requesting unit that requests, as the processing request, the management server to update the information of the image forming apparatus, and
      when receiving the delay-request requirement from the management server, stands by for the specified time, and then resends the processing request.

2. The information processing system according to claim 1, wherein
   the information includes location information, the location information indicating a site in which each of the at least one image forming apparatus is provided, and
   the priority deciding unit puts a high priority on the processing request if a current time of a site, in which the image forming apparatus is provided, is in a work time based on the location information of the image forming apparatus that sent the processing request.

3. The information processing system according to claim 1, wherein
   the information includes a counter value history of each of the at least one image forming apparatus, the counter value history being a history of a past counter value, and
   the priority deciding unit
      calculates a frequency of use on a basis of the counter value history of the image forming apparatus that sent the processing request, and
      puts a high priority on the processing request if the frequency of use is equal to or larger than a first threshold.

4. The information processing system according to claim 1, wherein
   the information includes a deadline of counter information of each of the at least one image forming apparatus, and
   the priority deciding unit puts a high priority on the processing request if a number of days from a current time to the deadline is equal to or smaller than a second threshold based on the counter information deadline of the image forming apparatus that sent the processing request.

5. An information processing method executed by an information processing system including a management server, and at least one image forming apparatus connected to the management server via a network, the information processing method comprising:
   by a memory device of the management server, storing an image forming apparatus database, the image forming apparatus database storing information of each of the at least one image forming apparatus in relation with a serial number of each of the at least one image forming apparatus, the serial number being a key;
   by an update requesting unit of each of the at least one image forming apparatus, requesting, as a processing request, the management server to update the information of the image forming apparatus;
   by a request receiving unit of the management server, receiving a processing request from each of the at least one image forming apparatus;
   by an overload detecting unit of the management server, detecting whether or not the management server is overloaded;
   by a priority deciding unit of the management server, if the management server is overloaded,
      searching the image forming apparatus database for the serial number in the processing request received by the request receiving unit, obtaining the information of the image forming apparatus that sends the processing request, and deciding a priority of processing the processing request on a basis of the obtained information;

by a request processing unit of the management server, processing the processing request, the priority deciding unit having decided that the processing request has a high priority;

by a delay-request requiring unit of the management server, sending a delay-request requirement to the image forming apparatus that sent the processing request, the priority deciding unit having decided that the processing request has a low priority, the delay-request requirement requiring to resend the processing request after a specified time; and by the update requesting unit of the image forming apparatus, receiving the delay-request requirement from the management server, standing by for the specified time, and then resending the processing request.

\* \* \* \* \*